United States Patent [19]

Shearer, Jr.

[11] 4,331,417
[45] May 25, 1982

[54] VEHICLE ALIGNMENT AND METHOD

[75] Inventor: James T. Shearer, Jr., Ada, Mich.

[73] Assignee: Rapitsan Division, Lear Siegler, Inc., Grand Rapids, Mich.

[21] Appl. No.: 128,261

[22] Filed: Mar. 7, 1980

[51] Int. Cl.$^3$ .............................................. G01V 9/04
[52] U.S. Cl. ............................. 414/273; 250/223 R; 414/786
[58] Field of Search ............................ 414/273–275, 414/281, 786; 356/400; 250/223 R

[56] References Cited

U.S. PATENT DOCUMENTS 3,815,084  6/1974  Pease .............................. 414/274 X
3,824,020  7/1974  Pease .............................. 414/274 X Primary Examiner—Robert G. Sheridan
Attorney, Agent, or Firm—Price, Heneveld, Huizenga & Cooper

[57] ABSTRACT

A system for accurately controlling the horizontal and vertical alignment of a materials handling vehicle with storage locations of a materials storage system includes a target positioned at a predetermined location with respect to each storage location and a sensor positioned on the materials handling vehicle and including three detectors positioned in a triangular pattern and responsive to the alignment of the detectors with a target to provide control signals employed to control the positioning of the vehicle for the accurate horizontal and vertical alignment of the vehicle with storage locations of the system.

17 Claims, 10 Drawing Figures

U.S. Patent  May 25, 1982  Sheet 2 of 4  4,331,417
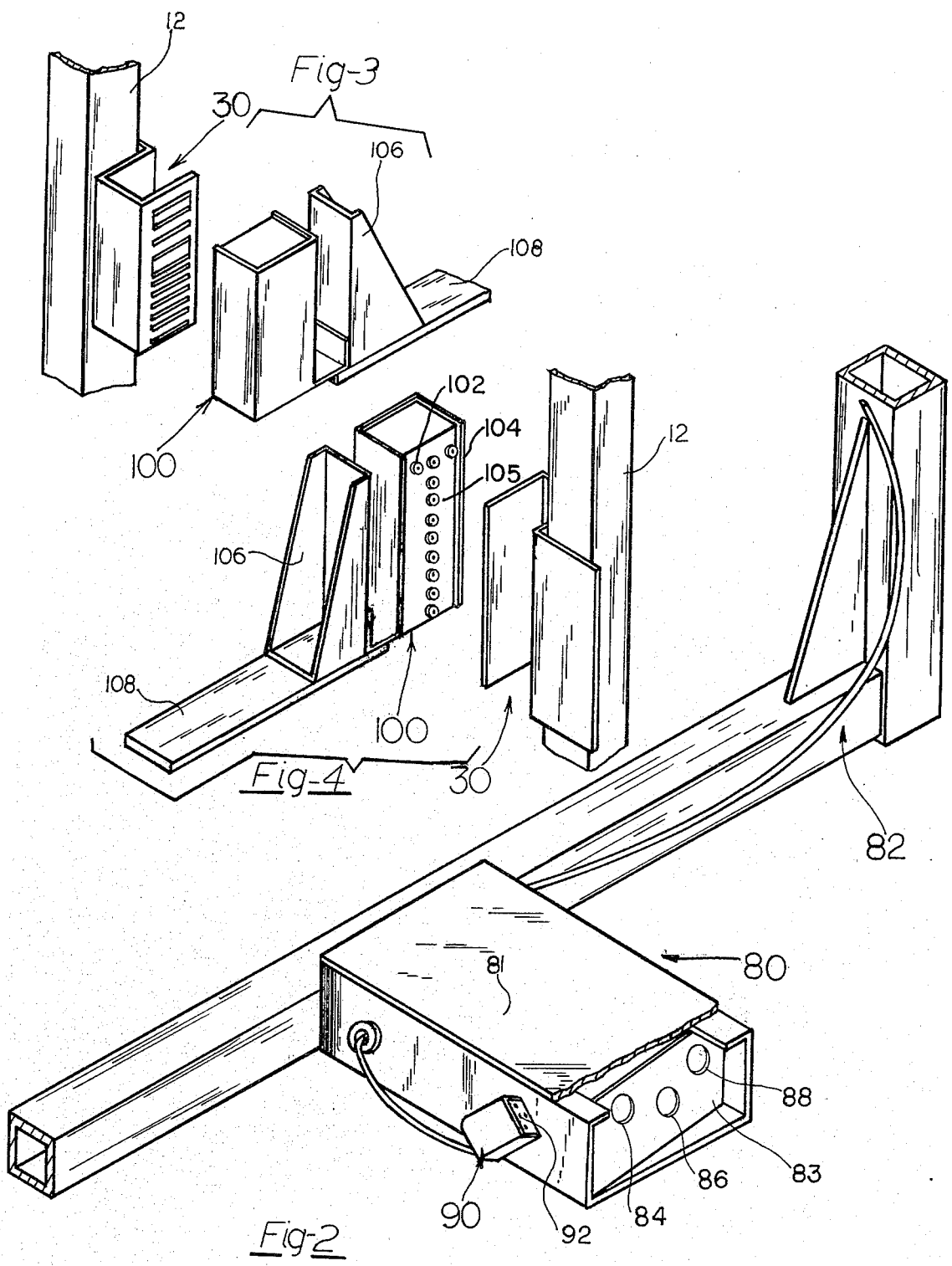

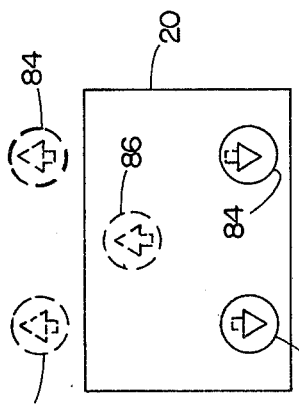
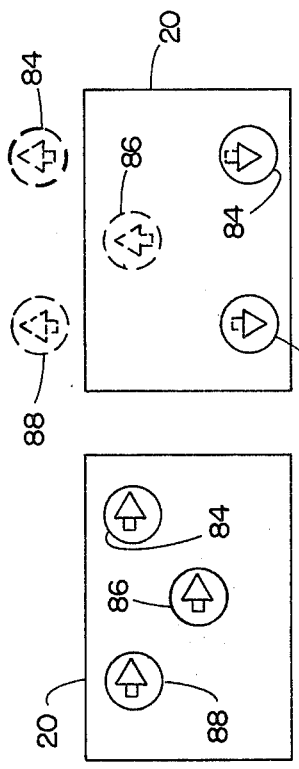
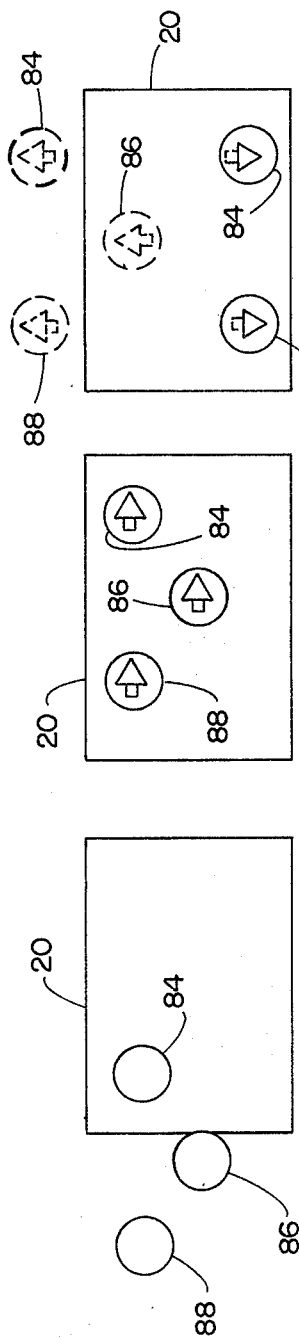
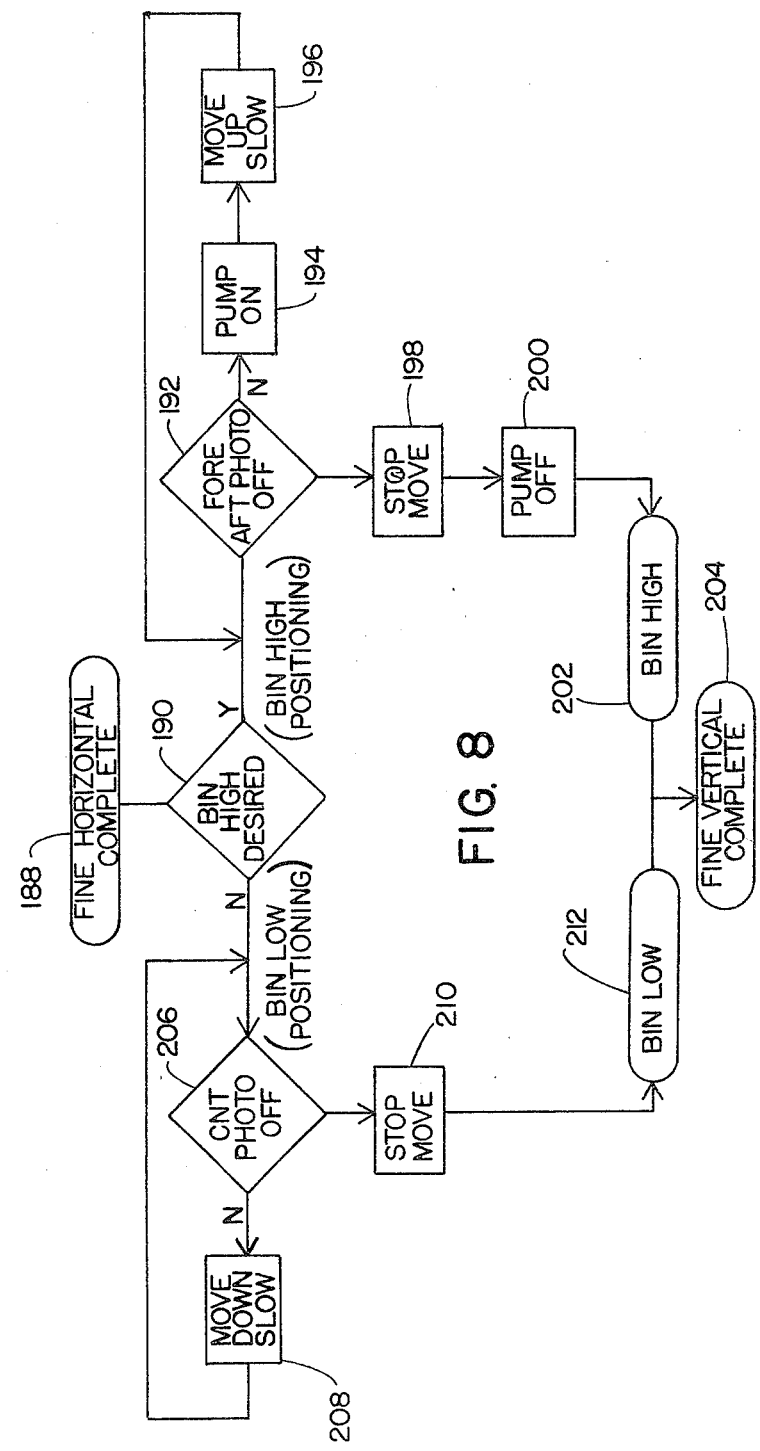

VEHICLE ALIGNMENT AND METHOD

BACKGROUND OF THE DISCLOSURE

The present invention relates to material handling apparatus and particularly to a control system for the fine vertical and horizontal positioning of a vehicle with respect to a storage location in the system.

In warehousing system where vehicles are employed for transporting articles and materials into and out of storage locations located in an array of storage bins, a variety of positioning means have been employed. Such systems include, for example, shaft encoders which provide pulses the number of which represent the distance a vehicle has traveled from a reference location such that by counting the number of pulses, the position of a vehicle can be coarsely estimated.

More accurate alignment systems include target means such as a retroreflective strip positioned on the materials storage rack at a predetermined location, and one or more light sensors positioned on the movable vehicle and aligned with the target when the vehicle is aligned in an operative position with respect to a storage location. Such systems may include more than a single sensor to provide a greater degree of accuracy in the control. U.S. Pat. No. 3,824,020, for example, represents one such system where vertical positioning of a material handling apparatus is controlled using a plurality of light sensors positioned in a line to provide relatively accurate alignment of the vehicle in a single direction. Also, a system has been proposed in which four detectors are arranged in a square pattern skewed at 45° to provide for the centering alignment of a conveyor device with respect to a target.

SUMMARY OF THE PRESENT INVENTION

The system of the present invention provides a target positioned at a predetermined location with respect to a first object, a second object including three detectors positioned in a triangular pattern and responsive to the alignment of the detectors with the target to provide predetermined control signals, a drive for moving at least one of the first or second objects with respect to the other of the first or second objects; and a control circuit coupled to the three detectors and responsive to control signals from them to provide signals applied to the drive for moving the first or second objects into a predetermined aligned position with respect to each other.

In a preferred embodiment the system is employed in a materials handling installation and provides fine alignment in both vertical and horizontal positions by providing target means at each storage location and sensing means on a movable article transferring vehicle having a triad arrangement of detecting means responsive to the target means such that the vehicle can be precisely aligned in both horizontal and vertical positions with respect to the storage locations. In the preferred embodiment of the invention, circuit means are coupled to the three detectors of the sensing means for providing control signals representing the alignment of one or more of the detectors with the target means and control signals therefrom are employed for actuating drive mechanisms for accurately positioning the vehicle in horizontal and vertical alignment with respect to a storage location.

By providing a triangular arrangement of light detectors, a greatly simplified vertical and horizontal fine position control system is provided which can be employed also for providing bin high and bin low position signals used to control the position of the vehicle's transfer mechanism for the lowering of articles into a storage bin and lifting articles from the storage bin respectively.

These and other features, objects and advantages of the present invention will become apparent upon reading the following description thereof with reference to the accompanying drawings in which:

BRIEF DESCRIPTION OF THE DRAWINGS

FIG. 2 is a fragmentary perspective view of the sensing means incorporated in the system of the present invention;

FIG. 3 is a fragmentary front perspective view of an address target and associated sensing means employed in the system of the present invention;

FIG. 4 is a fragmentary rear perspective view of the structure shown in FIG. 3;

FIG. 5A is a pictorial representation showing the interrelationship of the fine positioning sensing means with the associated target means in a first position;

FIG. 5B is a pictorial representation showing the interrelationship of the fine positioning sensing means with the associated target means in a second position;

FIG. 5C is a pictorial representation showing the interrelationship of the fine positioning sensing means with the associated target means in third and fourth positions;

FIG. 8 is a flow diagram of the vertical fine positioning of the materials handling vehicle with respect to a storage location.

DETAILED DESCRIPTION OF THE PREFERRED EMBODIMENT

Figure 1:
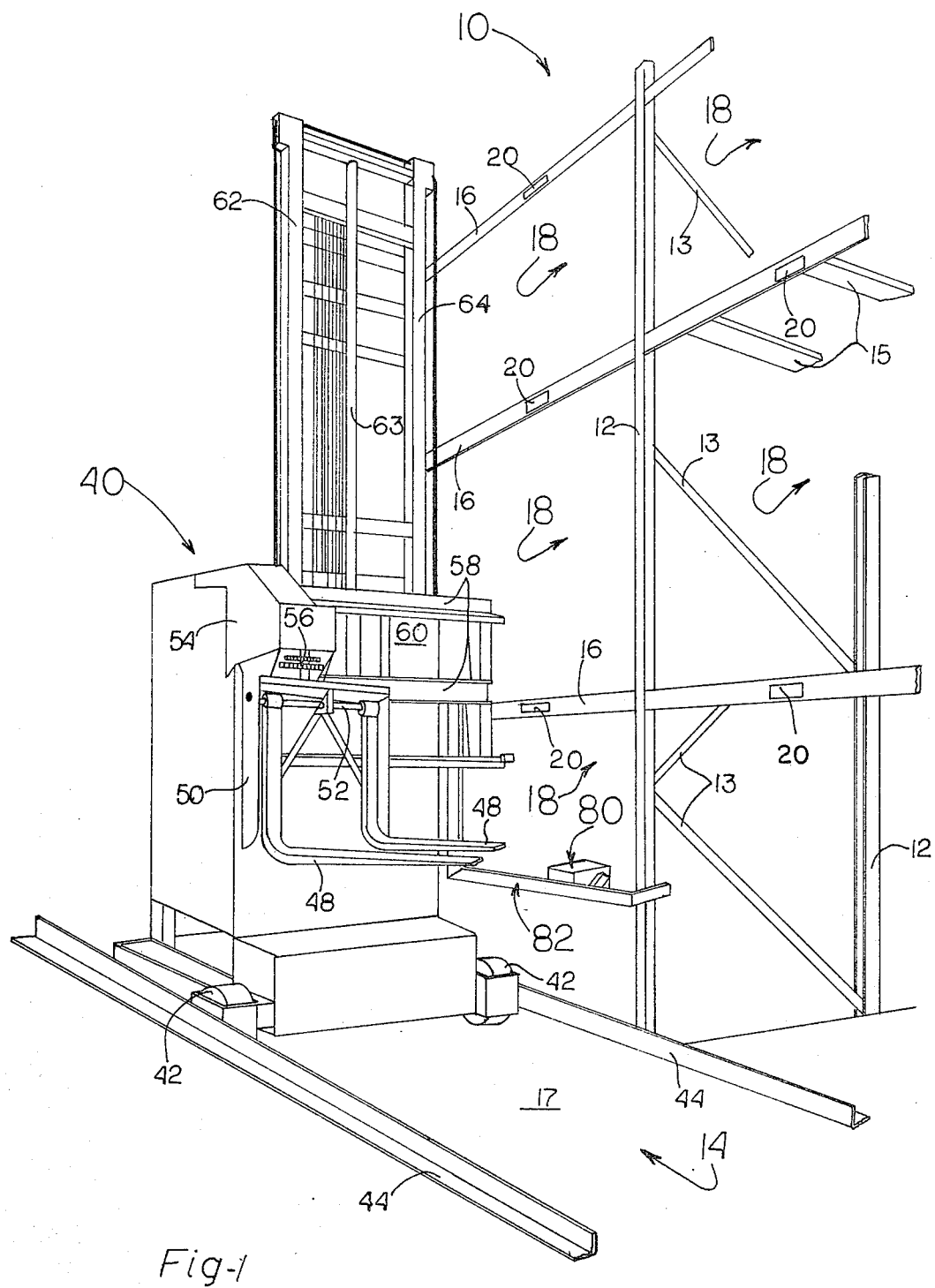
FIG. 1 is a fragmentary perspective view of a materials handling system embodying the present invention.

Referring initially to FIG. 1, there is shown a warehousing system embodying the present invention which includes a storage rack 10 including vertical support members 12 positioned at spaced intervals along an access aisle 14 extending along the face of the storage rack. Horizontal support members 16 extend between the vertical support members 12, and suitable cross frames 13 providing structural rigidity to the storage rack. The vertical and horizontal members 12 and 16 respectively and suitable floor supports 15 define a plurality of storage bins 18, which in the preferred embodiment, are divided into two storage locations, each having a width to receive a standard palletized load.

Positioned at a predetermined location in association with each storage location is target means 20, which in the preferred embodiment, comprises a rectangular block of retroreflective material adhered to the horizontal support member 16 of each of the storage bins at each storage location. The storage rack structure also includes, as seen in FIG. 3, position indicating indicia 30 uniquely identifying each storage location of the system. As will be described more fully hereinafter, the position indicia are employed to coarsely position a palletized material handling vehicle 40 (FIG. 1) in the vicinity of a storage bin to which palletized loads are to be delivered or picked up.

Vehicle 40 is adapted to move along the floor 17 of the installation with its wheels 42 supported directly on the floor but captively held between a pair of horizontally spaced, parallel guide brackets 44 defining a captive path extending along the face of the storage rack 10 for movement of the vehicle along the storage rack structure.

Vehicle 40 is a commerically available Model No. 35, swing reach picking vehicle, manufactured by the Raymond Corporation with the control and sensing means of the present invention separately incorporated.

The vehicle 40 handles palletized loads by means of a pair of spaced forks 48 mounted to be vertically pivotable with respect to a U-shaped frame 50 by means of a pivot shaft 52. Frame 50 is, in turn, rotatably mounted to a first carriage 54 by means of a vertical axle 56, and motor drive means (not shown). Such construction permits the forks 48 to be rotated to the left or right side of the vehicle, such that the vehicle can service facing storage racks on either side of the access aisle.

The first carriage 54 is slidably positioned on a pair of vertically spaced, horizontally and laterally extending guide rails 58 such that the forks can also be extended into and out of a storage location. Rails 58 and secured to a vertically movable elevator 60 supported by the vertically extending frame members 62 and 64 of the vehicle and movable to position the forks 48 at a desired vertical level for access to any of the storage locations within the system. Hydraulic drive means including an elongated cylinder 63 controls elevator 60, while electrical drive motors are employed for propelling the vehicle along the access aisle to a desired location.

As best seen in FIGS. 1 and 2, sensing means 80 embodying the present invention, is positioned on the elevator 60 by means of a support frame 82 such that the sensing means will be fixed in relationship to the elevator and the forks 48 carried thereon as the vehicle moves from one location to another in the system. Sensing means 80 cooperates with the target means 20 to provide fine vertical and horizontal positioning of the vehicle within an access aisle with respect to a preselected storage location once the forks of the vehicle are positioned in general alignment with a desired storage location.

The sensing means 80 of the preferred embodiment, as best seen in FIG. 2, comprises a generally rectangular housing 81 having a face wall 83 which is inclined with respect to a plane parallel to the targets 20 at an angle of approximately 6° such that any extraneous light which may be reflected from the support members of the rack structure will not cause activation of the light detectors contained therein. Thus, only a level of light sufficiently high indicating that the sensing means is aligned with the reflective target means 20 of a bin is sufficient to activate the control circuit. Mounted within housing 81, adjacent face 83 are three light detecting means 84, 86 and 88 arranged in a triangular pattern with detectors 84 and 88 positioned in horizontal alignment with one another, and detector 86 positioned between detectors 84 and 88, and slightly below in triangular arrangement. Each of the detectors is integrally formed in a photoelectric detector and light source pair, each of which includes a light source associated with a particular light detector such that illumination is directed outwardly from sensing means 80 toward the face of the storage rack structure and reflected light from the target is detected.

In the preferred embodiment where the target means 20 comprise a rectangular, retroreflective strip having a vertical dimension of 3.5 inches and a horizontal dimension of 4.5 inches, the light detectors 84, 88 and 86 were arranged in an inverted triangle with the detectors 84 and 88 horizontally spaced at 4 inches and forming an angle of about 20° between a line intersecting them and a second line extending from each of them to the third detector 86. The height of the triangle so formed is 0.75 inches. Thus, as seen in connection with FIG. 5B described below, the light detectors are capable of falling wholly within the rectangular target means when the vehicle is positioned such that the forks precisely align with a storage location within the bin. Naturally, this requires the light sensing means 80 to be positioned with respect to the forks on the vehicle, such that when it is aligned with the target means, the forks are operative to transfer palletized loads into or out of the storage location. Since, in the preferred embodiment, the sensing means are positioned approximately centrally at the lower horizontal support member of each storage location, the sensing means 80 provides a convenient location for the mounting of a bin full sensor 90 (FIG. 2) which is mounted on a sidewall of housing 81 and includes a light source and photo detecting means such that the light source directs light upwardly toward a storage bin, and in the event an article is within the bin, a bin full signal is generated.

The sensing means 80 and target means 20 associated therewith, are employed for providing fine horizontal and vertical positioning of the vehicle with respect to a storage location. For purposes of providing coarse or general alignment of the vehicle with respect to a particular storage location in the horizontal and vertical directions, conventional control means are provided. Thus in connection with the course vertical positioning, a vertical shaft encoder is provided and mounted to the vehicle and coupled to elevator 60 such that upon movement of the elevator from a reference location such as ground level, signals are generated which provide an indication of the height of the elevator and therefore the general positioning with respect to a storage bin. For purposes of providing general or coarse horizontal alignment, as well as for identifying a particular address to which the vehicle is to travel, the detection system shown in FIGS. 3 and 4, is employed.

As seen in FIG. 3, mounted to each of the vertical support members 12 of the storage rack structure is an address target 30 having a series of horizontally extending, vertically spaced retroreflective strips mounted on the elongated, rectangular surface thereof. The uppermost strip of reflective material on the address target 30 provides a centering strip for a pair of horizontally spaced photo detectors 102 and 104 associated with a reader 100 mounted to the vehicle in a location such that the reader can be vertically aligned with a target 30 as the vehicle travels along the access aisle. The remaining retroreflective strips or absence thereof on each target 30 define an eight bit digital address with seven bits carrying the address of a storage location and the remaining bit being a parity bit. These strips will align and be read by the eight photo detectors 105 when the vehicle has reached a specified location determined by counting the address targets as the vehicle travels along the aisle. Reader 100, as seen in FIGS. 3 and 4, is mounted to a framework 106 in turn mounted to a beam 108 secured to the framework of the load transferring vehicle 40. Since the targets 30 are vertically fixed on the framework, member 108 is not mounted to the elevator but is vertically fixed to the vehicle. In the preferred embodiment, horizontally extending beam 108 includes a second reader 100 on its opposite end, also positioned to read address targets 30 with a spacing between the two readers being selected such that one of the readers will be generally aligned with a target when the vehicle is in an aligned position with one of the two storage locations of a storage bin, and the other of the readers will be aligned with a different target when the vehicle is positioned in alignment with the other storage location of the storage bin. The electrical control system for providing both coarse and fine horizontal and vertical control of the picking vehicle is shown in FIG. 6 which is now described.

Figures 6, 7:
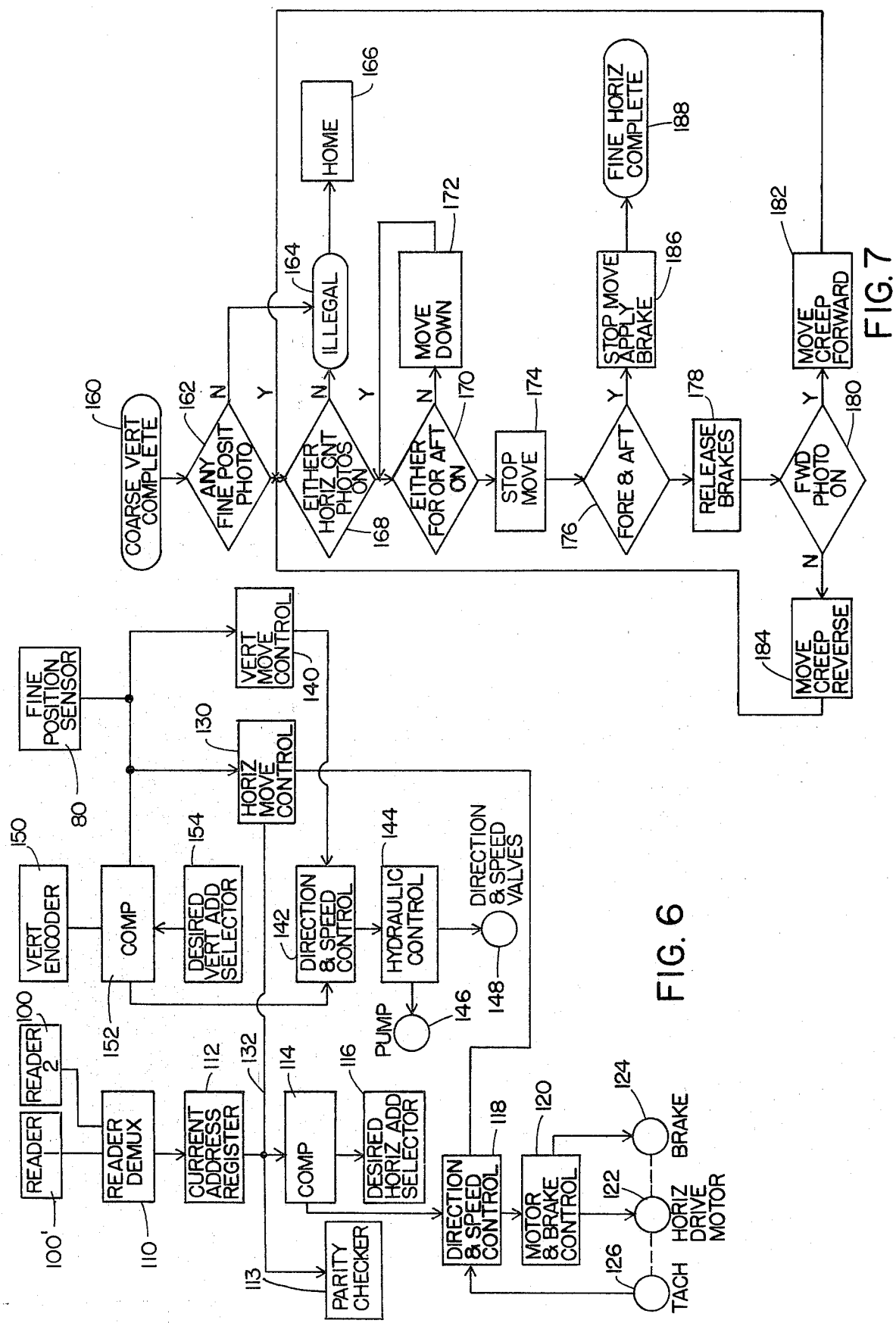
FIG. 6 is an electrical circuit diagram in block form of a control system employed in the system of the present invention.
FIG. 7 is a flow diagram of the horizontal fine positioning of the materials handling vehicle with respect to a storage location.

Referring now to FIG. 6 the address readers 100 and 100' are shown and are electrically coupled to a reader demultiplexer 110. The demultiplexer alternately couples the information detected by readers 100 and 100' to a current address register 112. Register 112 provides temporary storage of the information read by readers 100 and 100' and applies the information to an 8 bit digital comparator 114. The comparator receives a pre-programmed desired horizontal address signal from an address selector circuit 116 which can take the form of a digital switch where manual operation of the picking vehicle is employed or can be incorporated in the programming of a microprocessor circuit where the system is incorporated in a computer control design. Circuit 116 provides digital signals to comparator 114 representative of a horizontal picking location to which the vehicle is to travel for the receipt of or deposit of palletized articles. The address register 112 is also coupled to a parity checking circuit 113 which is employed to make certain that the address is properly read by readers 100 or 100'. In the event parity is not detected, the movement of the vehicle to a predetermined address is aborted.

So long as the current address read by reader 100 and applied to comparator 114 does not correspond to the desired address, a vehicle control signal from comparator 114 is applied to a direction and speed control circuit 118 which in turn provides control output signals to a motor and brake control circuit 120. The motor and brake control circuit is coupled to a horizontal drive motor 122 and to an electrically operated brake 124 for controlling the motion and braking of the vehicle. Coupled to the motor drive is a speed tachometer 126 which has an output applied to an input of the direction speed control 118 to provide a closed loop feedback system for speed control system.

The information stored in the current address register 112 also includes information pertaining to the receipt of a centering signal from detectors 102 and 104 (FIG. 4) indicating whether or not the reader 100 is centered on the address target 30. These signals are applied to a horizontal motion control circuit 130 by means of a conductor 132. The horizontal motion control circuit 130 also receives signals from the fine position sensors 80 as indicated in FIG. 6. Sensors 80 are also coupled to a vertical movement control circuit 140 having its output coupled to a direction and speed control circuit 142 which provides control signals for a hydraulic control system 144 forming an integral part of the commercial available vehicle 40. The hydraulic control system 144 thus provides signals which are employed for actuating a hydraulic pump 146 and direction and speed controlling valves 148. The vertical direction and speed control circuit 142 also receives signals from a vertical shaft encoder 150 which as described above, provides signals which are applied to a digital comparator 152. Comparator 152 compares the actual vertical position as represented by signals from the vertical encoder with the desired vertical position as represented by signals from a desired vertical address selector circuit 154. Circuit 154 like circuit 116 can be an integral part of a computer control system or can be a manually addressable circuit such as digital thumb wheel switches. Each of the circuits 100 to 154 are generally commercially available standard digital logic circuits with many of the circuits being incorporated in the commercially available vehicle itself. In the preferred embodiment of the invention the circuitry employed for the coarse and fine vertical and horizontal control signal generation applied to the control circuits 118 and 142 was achieved by use of a microprocessor such as an Intel 8080A, and associated RAM and EPROM memory circuits. Suitable interface circuits are employed to interface the microprocessor with the sensors 80 and 100 and to provide a digital data format to circuits 118 and 142 acceptable to such circuits. The coarse horizontal and vertical positioning is, as described above, conventional and does not form a part of the present invention other than to position the vehicle in the general area of the target means 20 associated with each storage location. The fine horizontal and vertical positioning achieved by the cooperation of target means 20 and the sensing means 80 on the vehicle is now described in conjunction with the flow diagrams of FIGS. 7 and 8, it being understood that the horizontal fine positioning is achieved first followed by the fine vertical positioning. The flow diagrams of FIGS. 7 and 8 forms the basis of the software programming for the microprocessor or the design of a hard wired solid state logic circuit which also could be employed to provide the desired control signals.

As noted above, the coarse horizontal position is determined by a comparison of the programmed address with an address read by readers 100 or 100'. Once the coarse position has been established, the vehicle stops at the column of bins to which it is programmed to travel, the vertical coarse positioning is achieved. This is accomplished by the hydraulic cylinder moving the elevator 60 with forks 48 thereon to the desired storage location level. The vertical shaft encoder 150 provides signals to the comparator 152 which continues to drive the hydraulic control system 144 until such time as the signals from the encoder indicate that the proper bin level has been reached.

With the coarse horizontal and vertical positioning completed, as indicated by block 160 in FIG. 7, the circuit first tests to ascertain if any of the three light detectors 84, 86 or 88 are aligned with the target means 20. This test is indicated by block 162 in FIG. 7 and a positive response is illustrated in FIG. 5A where the fore sensor 84 is positioned on the target means 20. Normally at least one of the light detectors will be on target after coarse positioning. In the event none are, a signal from the control circuit will indicate there is an illegal location as indicated by flow block 164 and provide an alarm indication to an operator who can then readdress the control system through, for example, a computer terminal, programming it to travel to a new address, attempt to have it move to the same address or have it returned to a home position as indicated by block 166. Assuming, however, the coarse positioning has been successful, the next test conducted by the control system is to ascertain as indicated by block 168, whether or not either of the horizontal centering photo detectors 102 and 104 (FIG. 4) are on the target 30. If not again, the illegal location routine indicated by blocks 164 and 166 are run.

If the test of block 168 is affirmative, the circuit tests to ascertain whether either the forward photo detectors 84 or the aft photo detectors 88 are on as indicated by block 170. As can be seen in reference to FIG. 5A, the vehicle could be positioned with the center and lower detector 86 on target 20 with the remaining detectors 84 and 88 above the target. If this is the case, the test in block 170 is negative and the control provides a vehicle control signal to direction and speed control circuit 142 to move the load handling elevator down slowly as indicated by block 172 until such time as one of the forward of aft photo cells is aligned with the target, at which time the control system stops the movement as indicated by block 174.

Next the system tests to ascertain whether both the forward photo detector 84 and aft detector 88 are aligned with the target as indicated by block 176. If not, the brakes 124 (FIG. 6) of the vehicle are released as indicated by block 178 and a test is conducted to ascertain whether or not the forward photo detector 84 is on as indicated by block 180. If the forward photo cell is on and the test from block 176 indicates the aft photo cell is not on, then it is desired to move the vehicle forward. This is accomplished as indicated by step 182 causing the vehicle to move very slowly forward. Thus, as the vehicle moves forward slowly, the program cycles through the decisional loop including blocks 168 through 180 until the test of block 176 is satisfied. If the forward photo is not on however, indicating that the vehicle is too far forward since the aft photo 88 is on the target, it is desired to move the vehicle in reverse slowly as indicated by block 184. Once both the forward and aft photos 84 and 88 are on target as indicated by block 176, a vehicle is positioned in the horizontal fine position and the drive motor 122 is deactivated and brake 124 applied as indicated by block 186 in FIG. 7. This completes the fine horizontal positioning as indicated by block 188 and the system then accomplishes the vertical fine positioning as illustrated by the flow diagram of FIG. 8 now described.

Naturally, when transferring loads into the system the forks 48 of the vehicle should be slightly above the floor level of the storage location such that the palletized load can be moved into the storage location without interference. This position is identified as a bin high position for purposes of transferring a load into the bin. When, however, it is desired to remove a palletized load from the storage bin, it is desired to have the forks in a bin low position such that they will extend into a pallet which then can be lifted off of the supporting floor of the storage location. Thus the control system includes programmed information as to whether or not the vehicle is dropping off a palletized load or picking up a load from the storage location.

Assuming initially that it is desired to drop a palletized load from the materials handling vehicle into a storage bin, a bin high position is thus required. Once the fine horizontal positioning is complete as indicated by block 188, a test is made to ascertain whether or not a bin high position is commanded as indicated by block 190. If it has been, the circuit, as indicated by block 192, tests to ascertain whether or not the forward and aft detectors 84 and 88 respectively, are off. If they are, as indicated in phantom form in FIG. 5C, it indicates that the forks 48 of the materials handling vehicle are in the desired bin high position. If not, as for example, if the vehicle is centered as shown in FIG. 5B, the hydraulic pump 146 (FIG. 6) on the elevator mechanism is actuated as indicated by block 194 and the elevator moved slowly upwardly as indicated by block 196 until the detector position shown in phantom form in FIG. 5C is reached, at which time the movement is stopped as indicated by block 198 and pump 146 is turned off as indicated by block 200. In this position the load handling forks of the vehicle are in a bin high position as indicated by block 202 and the fine vertical alignment is completed as indicated by block 204. Subsequent to this fine positioning, the vehicle load transferring mechanism is actuated to extend the forks into the storage bin. The control system then lowers the elevator 60 to the bin low position thus lowering the forks to transfer the load onto the storage location floor. The forks are then retracted from the storage location whereupon additional load transferring functions can be carried out.

If however, it is desired to pick up an article from storage, a bin low position is desired and the command will be tested by block 190 to ascertain this fact and first the center detector 86 checked (block 206) to ascertain whether it is in alignment with target means 20. If it is not, as indicated in solid lines in FIG. 5C, this indicates a bin low position in which the fore and aft cells are aligned but the center photo cell is not aligned with the target means. Thus, as indicated by block 206, if the center photo cell is aligned, the pump 194 again is actuated to gradually lower the elevator as indicated by block 208 until such time as the center detector 86 is off. At this time the pump is deactivated and the elevator stopped as indicated by block 210 and the bin low position as indicated by 212 is achieved, which completes the fine vertical alignment, after which the forks and elevator are actuated to extend the forks into a pallet, lift the pallet by moving the elevator to the bin high position, and remove it from the storage location. If desired in the preferred embodiment where the system is controlled by a microprocessor the vertical position can be continuously checked by completing the loop between the output of block 204 and the input of decision block 190 such that the desired position can be continuously monitored and maintained until the load transfer takes place.

The individual circuit components (FIG. 6) can, as indicated by the flow diagrams of FIGS. 7 and 8, be relatively elemental logic circuits. Thus for example, the testing of detectors 84, 86 and 88 can comprise OR gates, AND gates and the like, depending upon the decisional process required. Thus for example, for decisional block 192 of FIG. 8, the output signals from detectors 84 and 88 are applied to a NAND gate to provide the desired control signal. Similarly, an OR gate can be employed to achieve the decision making function indicated by block 170 in FIG. 7. Thus the system will permit application of the fine vertical and horizontal positioning to a control system employing a relatively uncomplicated logic circuitry. Alternatively, an overall microprocessor control system can be employed where the software programming is written in accordance with the flow diagrams of FIGS. 7 and 8. Naturally, where vehicle 40 serves both sides of an aisle, second sensing means 80 will be employed facing the opposite side of the aisle from sensor 80 shown in FIG. 1.

The adjustment system incorporating this invention can be employed for a variety of uses and it will become apparent to those skilled in the art that various modifications to the preferred embodiment of the invention described herein can be made without departing from the spirit or scope of the invention as defined by the appended claims.

The embodiments of the invention in which an exclusive property or privilege is claimed are defined as follows:

1. A system for controlling the alignment of an article transporting vehicle with respect to storage locations of an article storage system comprising:
    a storage structure for receiving and storing articles, said structure including a framework or vertical and horizontal support members defining an array of storage locations;
    target means positioned at a predetermined location with respect to each storage location;
    an article transporting vehicle including drive means for moving said vehicle to any of the storage locations in said storage structure, said vehicle including target sensing means having three detectors positioned in a triangular pattern and responsive to the alignment of said detectors with said target means to provide predetermined control signals therefrom for use in the fine horizontal and vertical centering of said vehicle with respect to a storage location; and
    control circuit means coupled to said target sensing means and responsive to said control signals from said detectors thereof to provide vehicle control signals applied to said drive means for actuating said drive means to position said vehicle in horizontal and vertical alignment with a storage location for the transfer of articles between said vehicle and said storage location.

2. The system as defined in claim 1 wherein said target means comprises a generally rectangular reflective strip positioned on said storage structure at each storage location and wherein said detectors are light responsive detectors.

3. The system as defined in claim 2 wherein said detectors form an inverted triangle with the base of said triangle having a length slightly less than the width of said reflective strips and the height of said triangle being less than the height of said reflective strips.

4. The system as defined in claim 3 wherein said target sensing means includes a housing having a mounting face for said detectors and wherein said mounting face is slightly inclined from a plane extending parallel to the plane of said reflective strips.

5. The system as defined in claim 4 wherein said control circuit means develops a bin high signal when a single detector is vertically and horizontally aligned with said reflective strip and a bin low signal when only the pair of detectors at the base of the triangle are aligned with said reflective strip, said bin high and bin low signals employed to position said vehicle in a horizontally aligned and vertically offset position for removing or inserting articles from or into a storage location, respectively.

6. The system as defined in claim 5 wherein said control circuit includes a microprocessor and interface circuit means coupling said microprocessor to said detectors for providing said vehicle control signals.

7. A method of aligning a materials handling vehicle with storage location for the transfer of articles between the vehicle and storage locations comprising the steps of:
    positioning a target at a predetermined location with respect to each storage bin location;
    positioning target sensing means having a triangular pattern of target detectors on a materials handling vehicle;
    developing control signals in response to the aligned status of the detectors with respect to the target; and
    moving the vehicle in response to the control signals such that the vehicle is aligned along mutually perpendicular axes with a storage location for the transfer of articles between the vehicle and the storage location.

8. The method as defined in claim 7 wherein said developing step includes the steps of providing a bin high signal when the vehicle has its load transfer means aligned incrementally above a storage location for the transfer of an article into the storage location and a bin low signal when the vehicle has its load transfer means aligned incrementally below a storage location for the removal of articles from the storage location.

9. A system for controlling the fine horizontal and vertical alignment of the article handling member of an article transporting vehicle with respect to storage locations of an article storage system comprising:
    a storage structure for receiving and storing articles, said structure including a framework of vertical and horizontal support members defining an array of storage locations;
    target means positioned at each storage location at a predetermined location on a support member adjacent each storage location;
    an article transporting vehicle including an article handling member and drive means for moving said vehicle and said article handling member to any of the storage locations in said storage structure, said vehicle including target sensing means fixedly mounted to said vehicle in predetermined relationship to said article handling member and having three detectors positioned in a triangular pattern and responsive to the selective alignment of said detectors with said target means to provide first control signals therefrom; and
    control circuit means coupled to said target sensing means and responsive to said first control signals from said detectors thereof to provide vehicle control signals applied to said drive means for actuating said drive means to position said vehicle and said article handling member thereof in alignment with a storage location for the fine horizontal and vertical positioning of said vehicle with respect to a storage location permitting the transfer of articles between said vehicle and said storage location.

10. The system as defined in claim 9 wherein said target means comprises a generally rectangular reflective strip positioned on said storage structure at each storage location and wherein said detectors are light responsive detectors.

11. The system as defined in claim 10 wherein said detectors form an inverted triangle with the base of said triangle having a length slightly less than the width of said reflective strips and the height of said triangle being less than the height of said reflective strips such that said detectors can all simultaneously align with said strips.

12. The system as defined in claim 11 wherein said target sensing means includes a housing having a mounting face for said detectors and wherein said mounting face is slightly inclined from a plane extending parallel to the plane of said reflective strips.

13. The system as defined in claim 12 wherein said control circuit means develops a bin high signal when a single detector is vertically and horizonally aligned with said reflective strip and a bin low signal when only the pair of detectors at the base of the triangle are aligned with said reflective strip, said bin high and bin low signals employed to position said vehicle in a horizontally aligned and vertically offset position for removing or inserting articles from or into a storage location, respectively.

14. The system as defined in claim 13 wherein said control circuit includes a microprocessor and interface circuit means coupling said microprocessor to said detectors for providing said vehicle control signals.

15. A system for controlling the relative positioning of two objects with respect to one another comprising:
target means positioned at a predetermined location with respect to a first object;
a second object including target sensing means having three detectors positioned in a triangular pattern and responsive to the alignment of said detectors with said target means to provide predetermined control signals therefrom;
means for moving at least one of said first or second objects with respect to the other of said first or second objects; and
control circuit means coupled to said target sensing means and responsive to said control signals from said detectors thereof to provide signals applied to said moving means for moving said first or second objects into a predetermined aligned position with respect to each other along mutually perpendicular axes.

16. A system for controlling the aligment of an article handling member with respect to an article comprising:
target means positioned at a predetermined location with respect to one of an article or an article handling member;
sensing means positioned at a predetermined location with respect to the other of said article or article handling member, said target sensing means having three detectors positioned in a triangular pattern and responsive to the alignment of said detectors with said target means to provide predetermined control signals therefrom;
means for moving at least one of said article or article handling member; and control circuit means coupled to said target sensing means and responsive to said control signals from said detectors thereof to provide motion control signals which can be applied to said moving means for moving one of said article or article handling member into a predetermined aligned position with respect to one another along mutually perpendicular axes.

17. A system for controlling the alignment of an article transporting vehicle with respect to storage locations of an article storage system comprising:
a storage structure for receiving and storing articles, said structure including a framework of vertical and horizontal support members defining an array of storage locations;
an article transporting vehicle including drive means for moving said vehicle to any of the storage locations in said storage structure;
target means positioned at a predetermined location with respect to one of each of said storage location or said vehicle;
target sensing means having three detectors positioned in a triangular pattern and responsive to the alignment of said detectors with said target means to provide predetermined control therefrom, said target sensing means positioned on the other of said storage locations or vehicle; and
control circuit means coupled to said target sensing means and responsive to said control signals from said detectors thereof to provide vehicle control signals applied to said drive means for actuating said drive means to position said vehicle in precise horizontal and vertical relationship with respect to a storage location.

* * * * *

UNITED STATES PATENT AND TRADEMARK OFFICE
CERTIFICATE OF CORRECTION

PATENT NO. : 4,331,417  Page 1 of 2
DATED : May 25, 1982
INVENTOR(S) : James T. Shearer Jr.

It is certified that error appears in the above—identified patent and that said Letters Patent is hereby corrected as shown below:

Title page, [73] Assignee:

"Rapitsan" should be --Rapistan--

Column 1, line 9:

"system" should be --systems--

Column 3, line 27:

"and" (second occurrence) should be --are--

Column 4, line 38:

"course" should be --coarse--

Column 5, line 53:

After "for" insert --the--

Column 6, line 36:

"forms" should be --form--

Column 6, line 43:

After "coarse" insert --horizontal--

Column 7, line 19:

"of" should be --or--

UNITED STATES PATENT AND TRADEMARK OFFICE
CERTIFICATE OF CORRECTION

PATENT NO. : 4,331,417
DATED : May 25, 1982
INVENTOR(S) : James T. Shearer Jr.

It is certified that error appears in the above—identified patent and that said Letters Patent is hereby corrected as shown below:

Column 8, line 27:

After "86" insert --is--

Column 9, line 17:

"or" should be --of--

Column 10, line 47:

"thereform" should be --therefrom--

Column 10, line 52:

Delete "and"

Signed and Sealed this

Tenth Day of May 1983

[SEAL]

Attest:

GERALD J. MOSSINGHOFF

*Attesting Officer*     *Commissioner of Patents and Trademarks*